(12) United States Patent
Fountain

(10) Patent No.: US 9,077,877 B2
(45) Date of Patent: Jul. 7, 2015

(54) ACTIVE HEADWEAR FOR DETACHABLY MOUNTING AN IMAGING DEVICE

(71) Applicant: Thomas Lee Fountain, Woodland Hills, CA (US)

(72) Inventor: Thomas Lee Fountain, Woodland Hills, CA (US)

(73) Assignee: Fountain, Inc., Woodland Hills, CA (US)

( * ) Notice: Subject to any disclaimer, the term of this patent is extended or adjusted under 35 U.S.C. 154(b) by 98 days.

(21) Appl. No.: 13/987,215

(22) Filed: Jul. 10, 2013

(65) Prior Publication Data
US 2014/0027591 A1 Jan. 30, 2014

Related U.S. Application Data

(60) Provisional application No. 61/670,692, filed on Jul. 12, 2012.

(51) Int. Cl.
| | |
|---|---|
| *H04N 5/232* | (2006.01) |
| *H04N 5/225* | (2006.01) |
| *F16M 13/04* | (2006.01) |
| *H04N 5/77* | (2006.01) |
| *F16M 11/10* | (2006.01) |
| *F16M 13/00* | (2006.01) |

(52) U.S. Cl.
CPC ............. *H04N 5/2253* (2013.01); *F16M 13/04* (2013.01); *H04N 5/2252* (2013.01); *H04N 5/225* (2013.01); *H04N 5/77* (2013.01); *F16M 11/10* (2013.01); *F16M 13/00* (2013.01)

(58) Field of Classification Search
CPC . H04N 5/2252; H04N 5/2253; H04N 5/2251; H04N 5/225; H04N 5/77; G03B 17/08
USPC .................. 248/226.11; 348/81, 211.14, 376; 396/25, 419, 422
See application file for complete search history.

(56) References Cited

U.S. PATENT DOCUMENTS

| | | | | |
|---|---|---|---|---|
| 7,576,800 | B2 * | 8/2009 | Swain | 348/376 |
| 7,871,205 | B2 * | 1/2011 | Inoue | 396/422 |
| 8,310,555 | B2 * | 11/2012 | Ludlow | 348/211.14 |
| 2008/0192114 | A1 * | 8/2008 | Pearson et al. | 348/81 |

* cited by examiner

*Primary Examiner* — Todd M Epps
(74) *Attorney, Agent, or Firm* — Jeffrey A. McKinney; McKinney Law Group APC

(57) ABSTRACT

Disclosed is a mounting system and method for securing an imaging device to active headgear. In one embodiment, the mounting system includes a headwear frame to which can be attached a head strap to form a diving mask. A digital camera or a video recorder can be secured to an attachment base in the mounting system to allow use thereof in a hands-free operating mode.

8 Claims, 7 Drawing Sheets

ACTIVE HEADWEAR FOR DETACHABLY MOUNTING AN IMAGING DEVICE

CROSS REFERENCE TO RELATED APPLICATION

The present Application claims the benefit of U.S. Provisional Patent Application No. 61/670,692, entitled "Eyewear with Provision for Detachably Mounting an Imaging Device," filed Jul. 12, 2012, incorporated herein by reference in its entirety.

FIELD OF THE INVENTION

The present invention relates to a system and method for securing an imaging device to active headwear.

BACKGROUND OF THE INVENTION

Commercially-available headwear, such as a diving mask 10 shown in FIG. 1, does not include provisions for integrating cameras. The diving mask 10 includes an eye frame 12 and an attachment strap 14. The eye frame 12 serves to retain lenses 16, 18, but are otherwise featureless and have no provision for the attachment of an accessory.

Recent attempts to provide for cameras or other imaging devices within, or on, goggles or masks have had limited success. In such headwear, the cameras are usually attached to the frame of the goggle or mask, either in a frontal configuration, or on the temples. But cameras are not readily attached to such goggle or mask frames. Moreover, when the active headwear is a fashionable item whose designs are important, there are substantial design tradeoffs involved with providing or attaching cameras or other imaging devices. For example, published U.S. Patent Application 2008/0192114 "Wearable Waterproof Camera" of Pearson et al., discloses the placement of a camera inside a compartment, where the compartment unit snaps on or attaches to head-adapted gear such as eye-protective head-gear of various proportions.

There remains a need for an improved active headwear system having a mount adapter for detachably mounting an imaging device, such as a digital camera or video recorder, so as to allow the wearer full and free use of his or her hands, while supporting the imaging device for operation when desired.

BRIEF SUMMARY OF THE INVENTION

In one aspect of the present invention, a mounting assembly, suitable for securing an imaging device to the head of a user comprises: a headwear frame configured for placement over the face of the user, the headwear frame having a first mounting rim disposed at a first side of the headwear frame and a second mounting rim disposed at a second side of the headwear frame; and an attachment base, the attachment base including at least two engagement tabs configured to mate with a camera mount, the attachment base further including a first clamp configured to mate with the first mounting rim and a second clamp configured to mate with the second mounting rim.

In another aspect of the present invention a mounting assembly, suitable for securing an imaging device to the head of a user comprises: an attachment base integrated with a headwear frame configured for placement over the face of the user, the attachment base including at least two engagement tabs configured to mate with a camera mount.

The additional features and advantages of the disclosed invention are set forth in the detailed description which follows, and will be apparent to those skilled in the art from the description or recognized by practicing the invention as described, together with the claims and appended drawings.

BRIEF DESCRIPTIONS OF THE DRAWINGS

DETAILED DESCRIPTION OF THE INVENTION

"Active headwear" refers to eyeglasses, goggles, masks, or other objects worn over the eyes.

"Imaging device" refers to a digital camera, a video recording device, a portable projector, and the like.

"Fastener" refers to mechanical components that fasten, join, connect, secure, hold, or clamp parts together. Fasteners include, but are not limited to, screws, nuts and bolts, rivets, snap-fits, and the like.

"Mounting" includes, but is not limited to, joining, connecting, fastening, linking, coupling, or associating two parts together.

"Configure" includes the designing, arranging, setting up, or shaping with a view to specific applications or uses.

The present invention relates generally to a mounting system for attaching an imaging device to active headwear (e.g., diving mask). In one embodiment, the mounting system includes a headwear frame to which can be attached a head strap to form a diving mask. A digital camera or a video recorder can be secured to an attachment base in the mounting system to allow use thereof in a hands-free operating mode.

Figure 1:
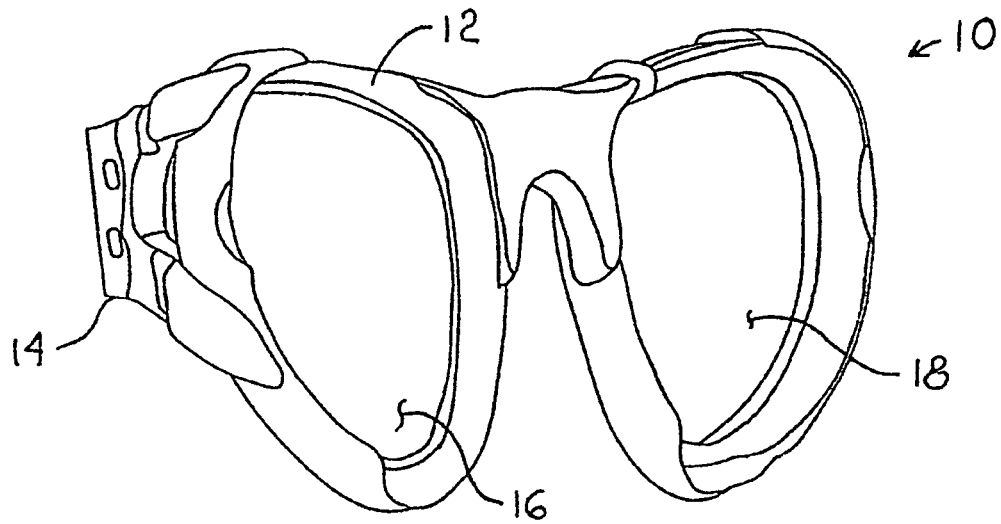
FIG. 1 is an example of active headwear, in accordance with the present state of the art.
Figure 2:
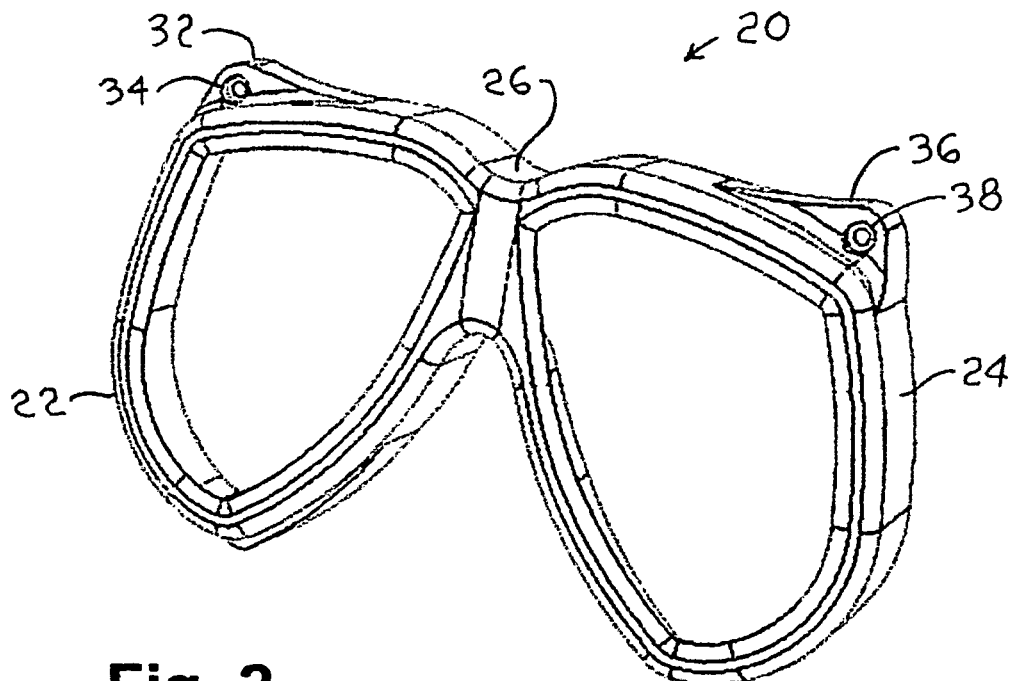
FIG. 2 is an isometric diagrammatical illustration of a headwear frame from an active headwear apparatus, in accordance with the present invention.

FIG. 2 shows one embodiment of a headwear frame 20 suitable for attachment to a wearer's head using a head strap or a headband (not shown). The headwear frame 20 includes a right lens frame 22 attached to a left lens frame 24 by a nosepiece 26. The right lens frame 22 may include a right mounting rim 32 with a through hole 34 having a pre-specified diameter. Similarly, the left lens frame 24 may include a left mounting rim 36 with a through hole 38. The right lens frame 22 and the left lens frame 24 may be sized and shaped to accommodate a set of commercially-available lenses or inserts, including prescription lenses.

Figure 3:
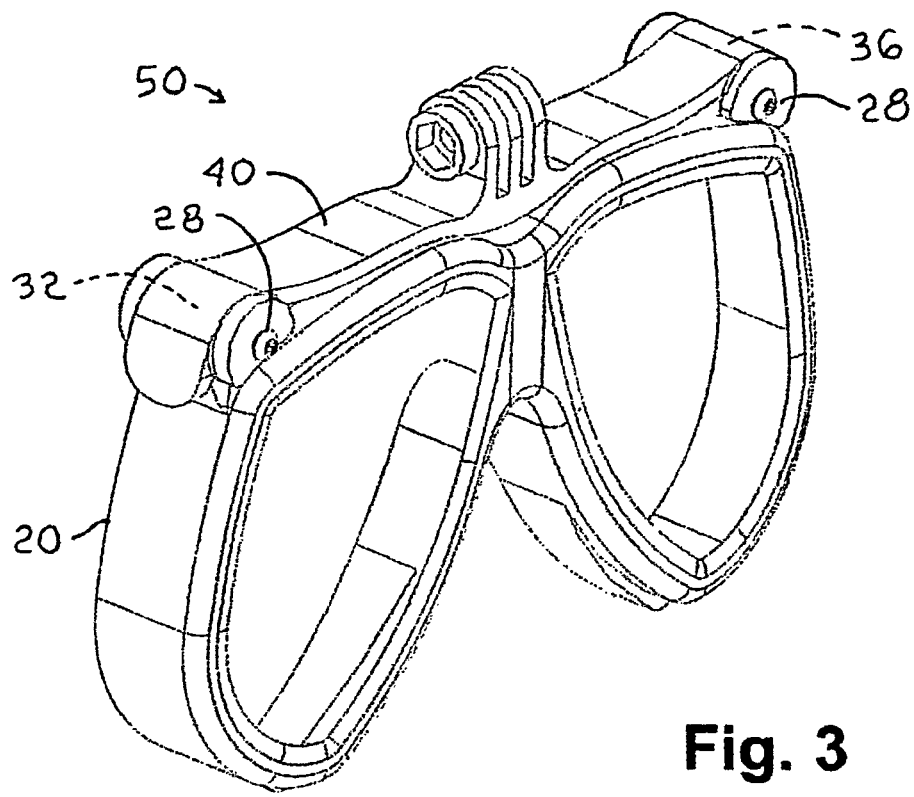
FIG. 3 is an isometric diagrammatical illustration of the headwear frame of FIG. 2 mated with an attachment base to form a mounting assembly.
Figure 4:
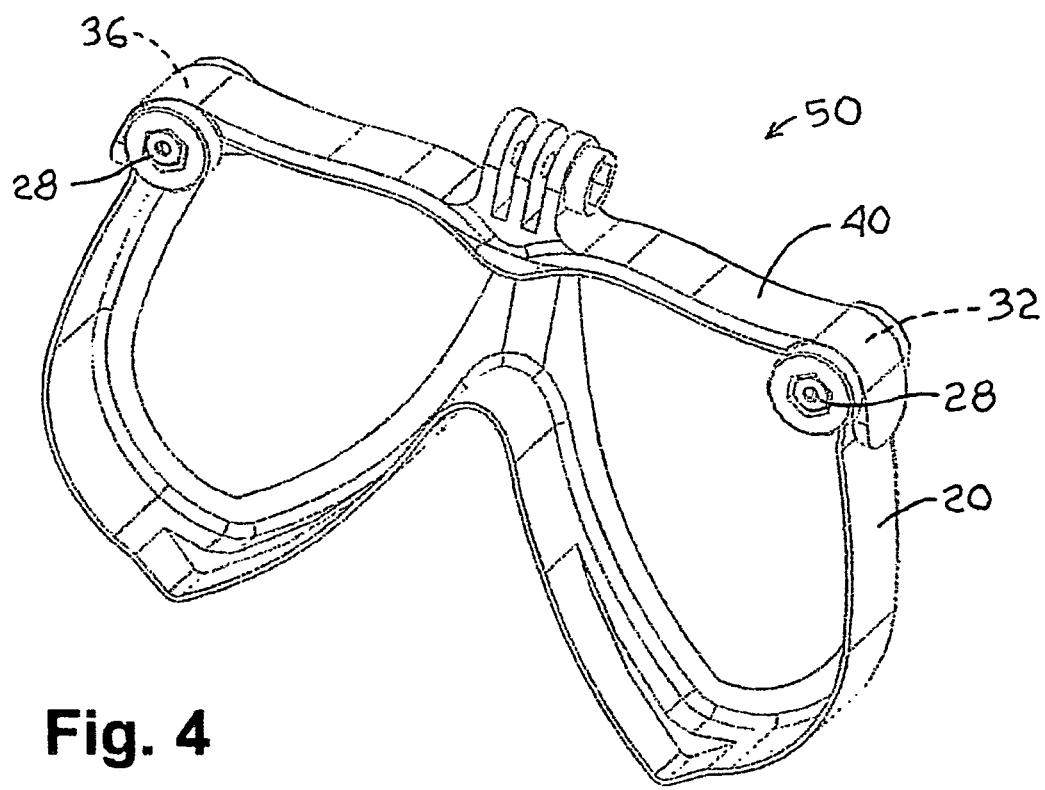
FIG. 4 is another isometric diagrammatical illustration of the mounting assembly of FIG. 3.
Figure 5:
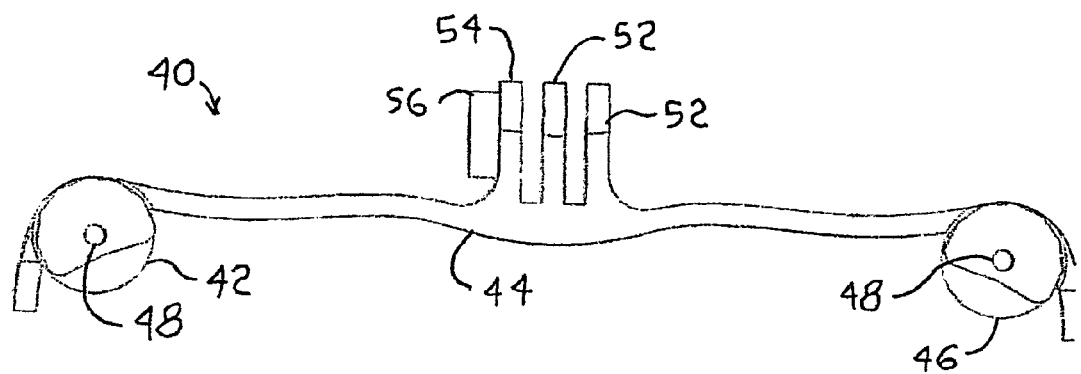
FIG. 5 is a front view of the attachment base of FIG. 3.
Figure 6:
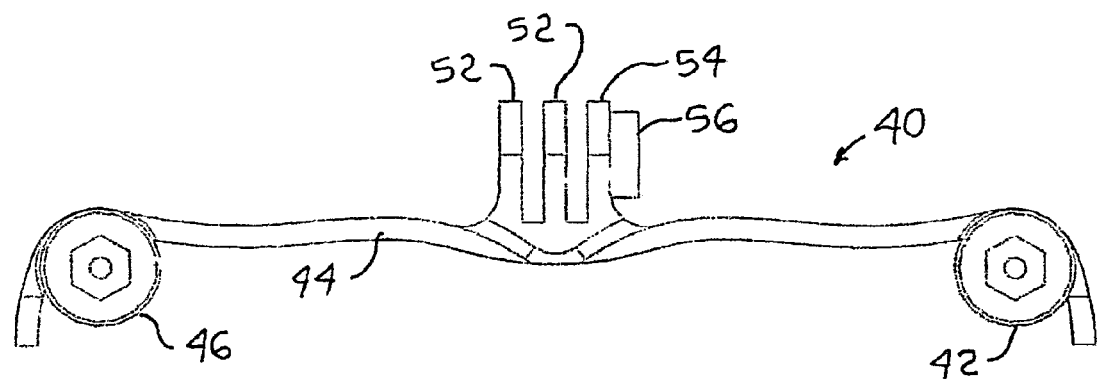
FIG. 6 is a rear view of the attachment base of FIG. 3.
Figure 7:
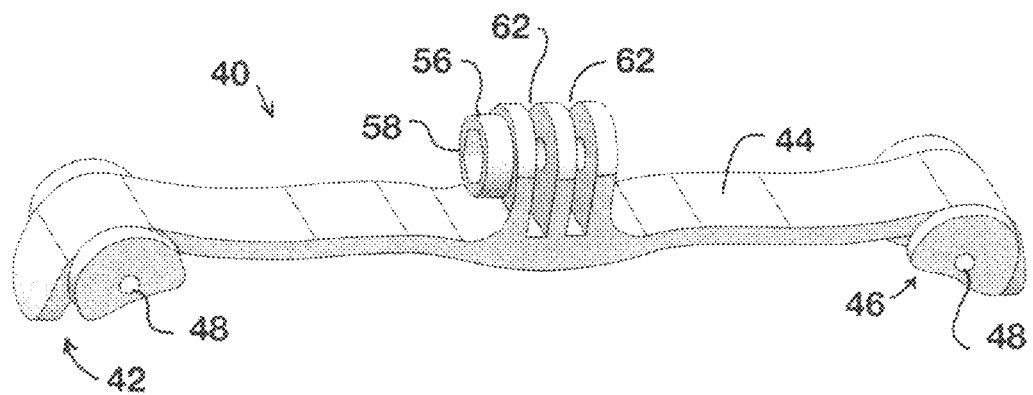
FIG. 7 is an isometric view of the attachment base of FIG. 3.
Figure 8:
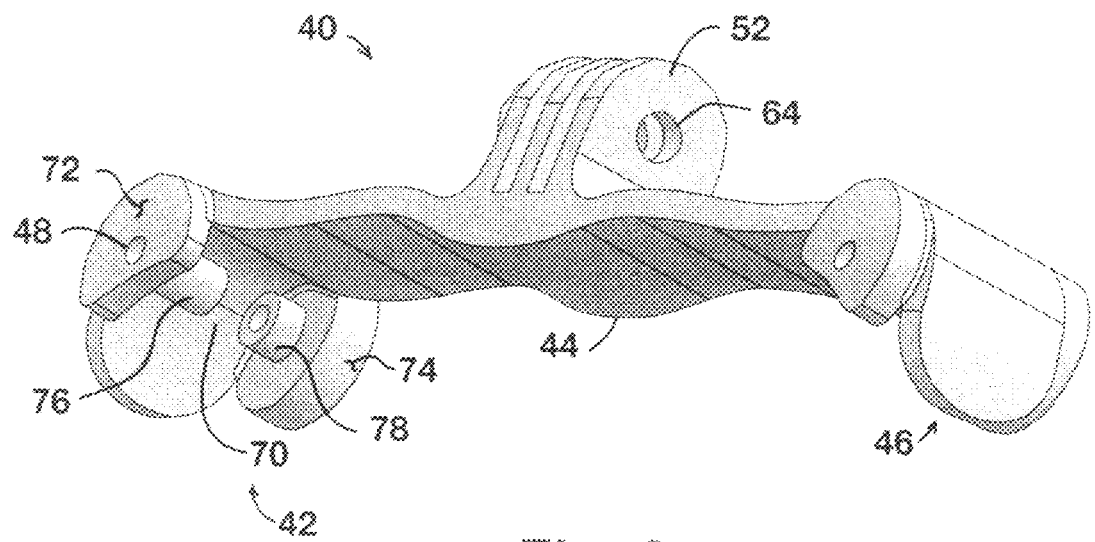
FIG. 8 is another isometric view of the attachment base of FIG. 3.

The headwear frame 20 is adapted to support and removably retain an attachment base 40, as shown in FIGS. 3 and 4. The attachment base 40 is sized and configured to support and removably retain an imaging device (shown in FIG. 9), such as a digital camera or a video recorder. The attachment base 40 may be removably secured to the headwear frame 20 by a first fastener 28 passing through the attachment base 40 and the right mounting rim 32, and a second fastener 28 passing through the attachment base 40 and the left mounting rim 36. The combination of the attachment base 40, the fasteners 28, and the headwear frame 20 comprise a mounting assembly 50.

Figure 9:
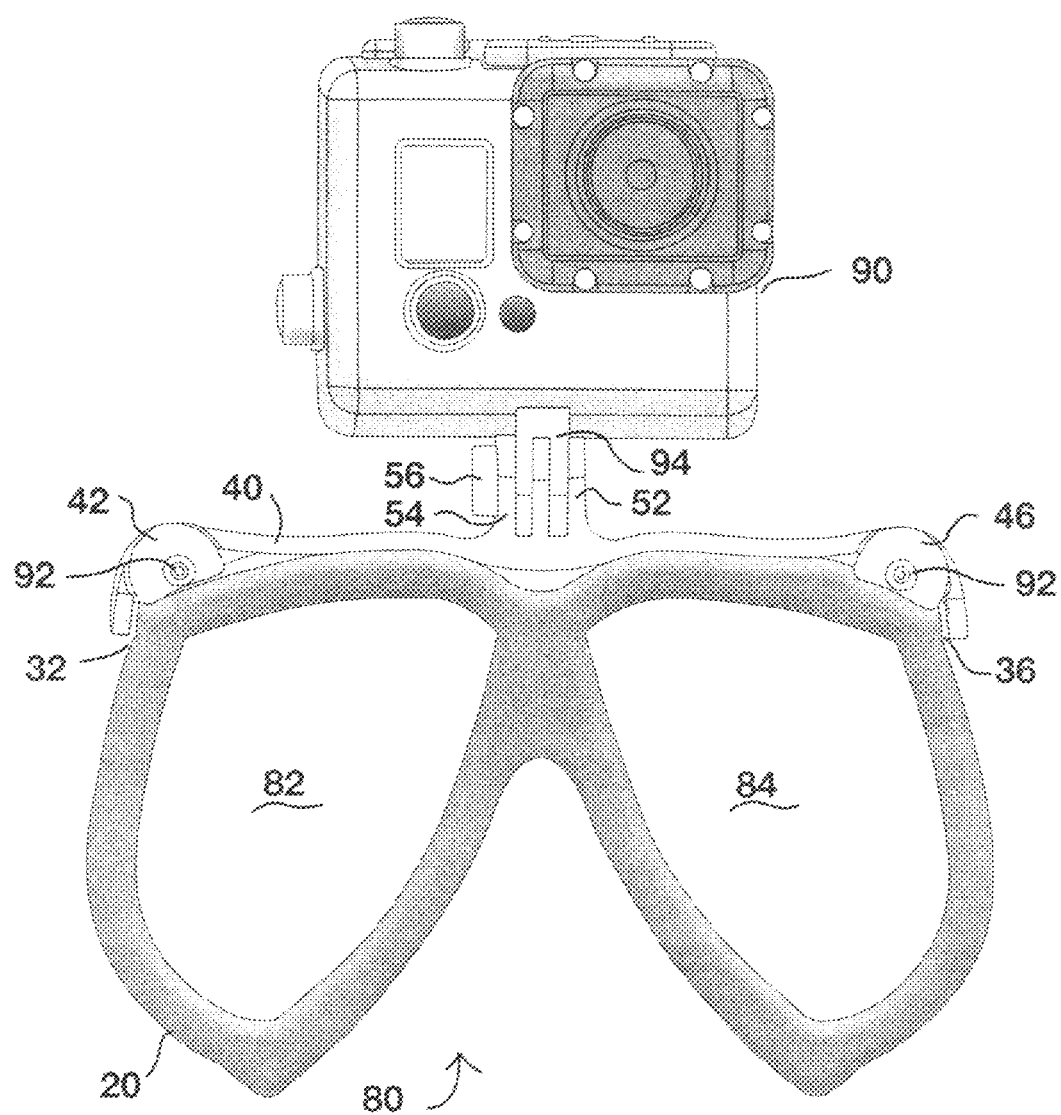
FIG. 9 is a front view of the headwear frame and attachment base of FIG. 3 with an imaging device attached to the attachment base.

In an embodiment, the attachment base 40 may include a right clamp 42 at one end of a lateral beam 44, and a left clamp 46 at the other end of the lateral beam 44, as shown in FIGS. 5-8. A through hole 48 may be provided in the right clamp 42 and the left clamp 46 so as to accommodate a mechanical fastener (not shown), as understood in the relevant art. Two or more engagement tabs 52 and a retainer engagement tab 54 may be provided on the lateral beam 44 between the right clamp 42 and the left clamp 46. In an exemplary embodiment, the engagement tabs 52 may be located at a midpoint on the lateral beam 44. The engagement tabs 52 and the retainer engagement tab 54 are spaced apart so as to define open transverse slots 62 suitable for the insertion of a camera mount (as best seen in FIG. 9), for example.

The retainer engagement tab 54 may include a boss 56 with a recess 58 (hexagonal recess shown) configured to hold a fastening device, such as a threaded nut (not shown). Each of the engagement tabs 54 may include a through hole 64, where the through holes 64 line up with the recess 58. This configuration allows for the insertion of a threaded fastener (not shown) into the through holes 64 so as to mate with the threaded nut held in the recess 58, as is well-known in the relevant art.

The right clamp 42 may include a right front depending tab 72 and a right back depending tab 74 configured to engage the right mounting rim 32 (shown in FIG. 2). The right front depending tab 72 may include a right front spacer 76, and the right back depending tab 74 may include a right back spacer 78. It can be appreciated that the through hole 48 is configured to pass through the right front depending tab 72, the right front spacer 76, the right back spacer 78, and the right back depending tab 74. The right front spacer 76 and the right back spacer 78 define an axial gap 70 of sufficient size to allow insertion of the right mounting rim 32.

Preferably, when the right mounting rim 32 is inserted into the axial gap 70, the through hole 34 lines up with the through hole 48 so as to allow for the insertion of a mechanical fastener (not shown), and thus retain the right clamp 42 on the right mounting rim 32. The left clamp 46 is similarly configured (not shown for clarity of illustration) so as to allow placement of the left mounting rim 36 into the left clamp 46 such that the through hole 38 lines up with the through hole 48 in the left clamp 46. The placement of the left mounting rim 36 into the left clamp 46 thus allows for the insertion of a mechanical fastener (not shown) into the through hole 48 and the through hole 38, and thus retain the left clamp 46 on the left mounting rim 36.

As shown in FIG. 9, the headwear frame 20 may provide for installation of a right lens 82, a left lens 84, and the attachment of a strap (not shown) to produce a diving mask 80, for example. The attachment base 40 can be secured to the diving mask 80 by (1) aligning the right clamp 42 with the right mounting rim 32, (2) aligning the left clamp 46 with the left mounting rim 36, (3) securing a first base fastener 92 in the right clamp 42, and (4) securing a second base fastener 92 in the left clamp 46.

An imaging device 90 may be secured to the attachment base 40, where the imaging device 90 includes a camera mount 94 configured to mate with the engagement tabs 52 and the retainer engagement tab 54. After the camera mount 94 has been mated with the engagement tabs 52 and the retainer engagement tab 54, a fastener (not shown) may be placed through boss 56, retainer engagement tab 54 and engagement tabs 52 using through holes 64 (not shown) to more positively secure the imaging device 90 to the diving mask 80.

Figure 10:
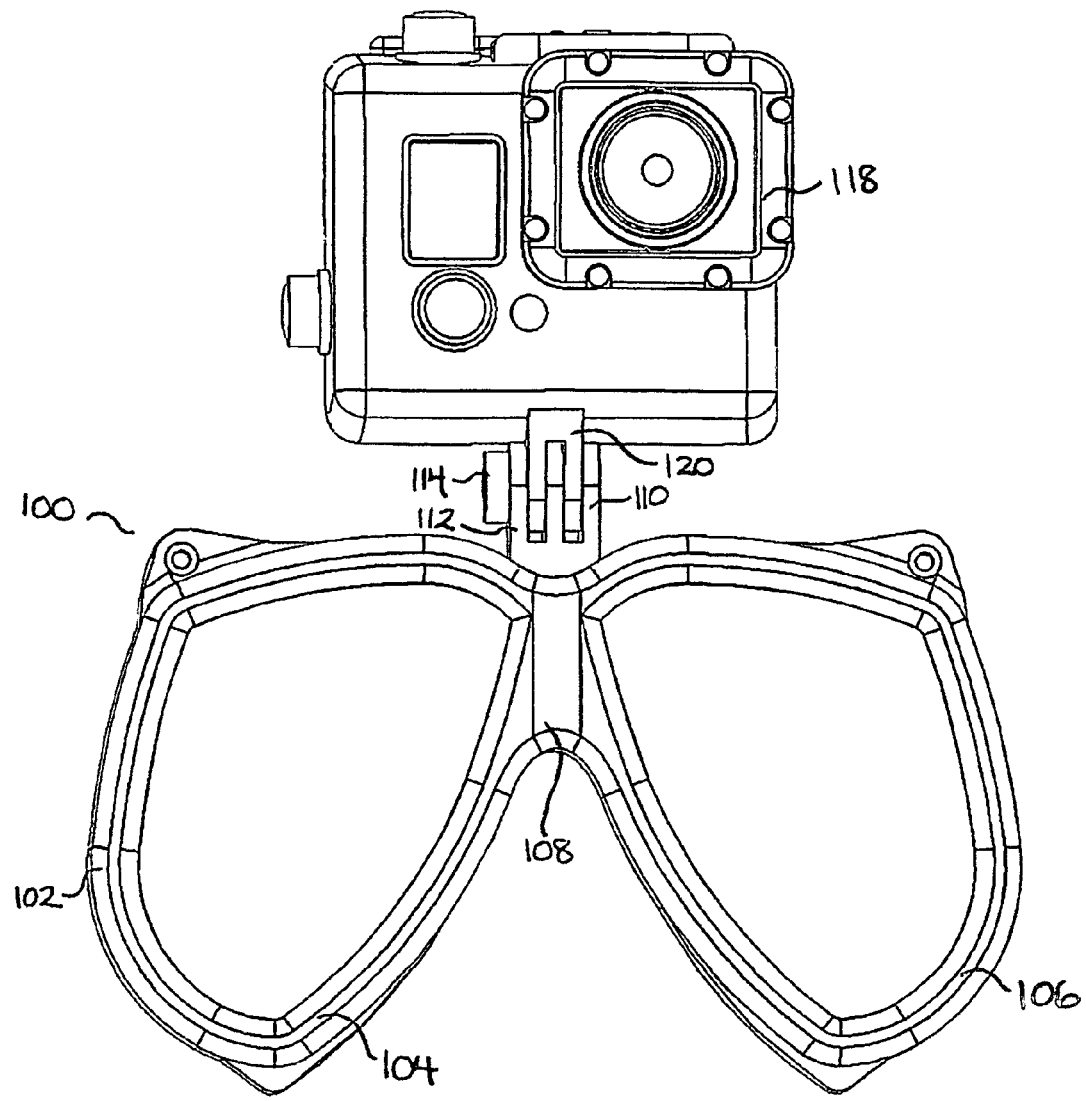
FIG. 10 is an isometric diagrammatical illustration of a front view of an integrated headwear frame and attachment base with an imaging device attached to the attachment base.

Another embodiment of the invention, where the headwear frame and attachment base are integrated (i.e., not separable), with an imaging device attached to the attachment base, is shown in FIG. 10 (front view). Mounting assembly 100 includes frame 102 and a right lens frame 104 attached to a left lens frame 106 by a nosepiece 108. Two or more engagement tabs 110 and adjacent retainer engagement tab 112, including a boss 114 configured to hold a fastening device, may be provided at the top of the nosepiece 108. Each of the engagement tabs 110 may include a through holes 116 (shown in FIG. 11). This configuration allows for the insertion of a threaded fastener (not shown) into the through holes, as is well-known in the relevant art.

Imaging device 118 includes a camera mount 120 configured to mate with the engagement tabs 110 and retainer engagement tab 112. The imaging device is secured to the mounting assembly 100 after camera mount 120 has been mated with the engagement tabs 110 and the retainer engagement tab 112 by placing a threaded fastener (not shown) into through holes 116 to more positively secure the imaging device 118 to mounting assembly 100.

Figure 11:
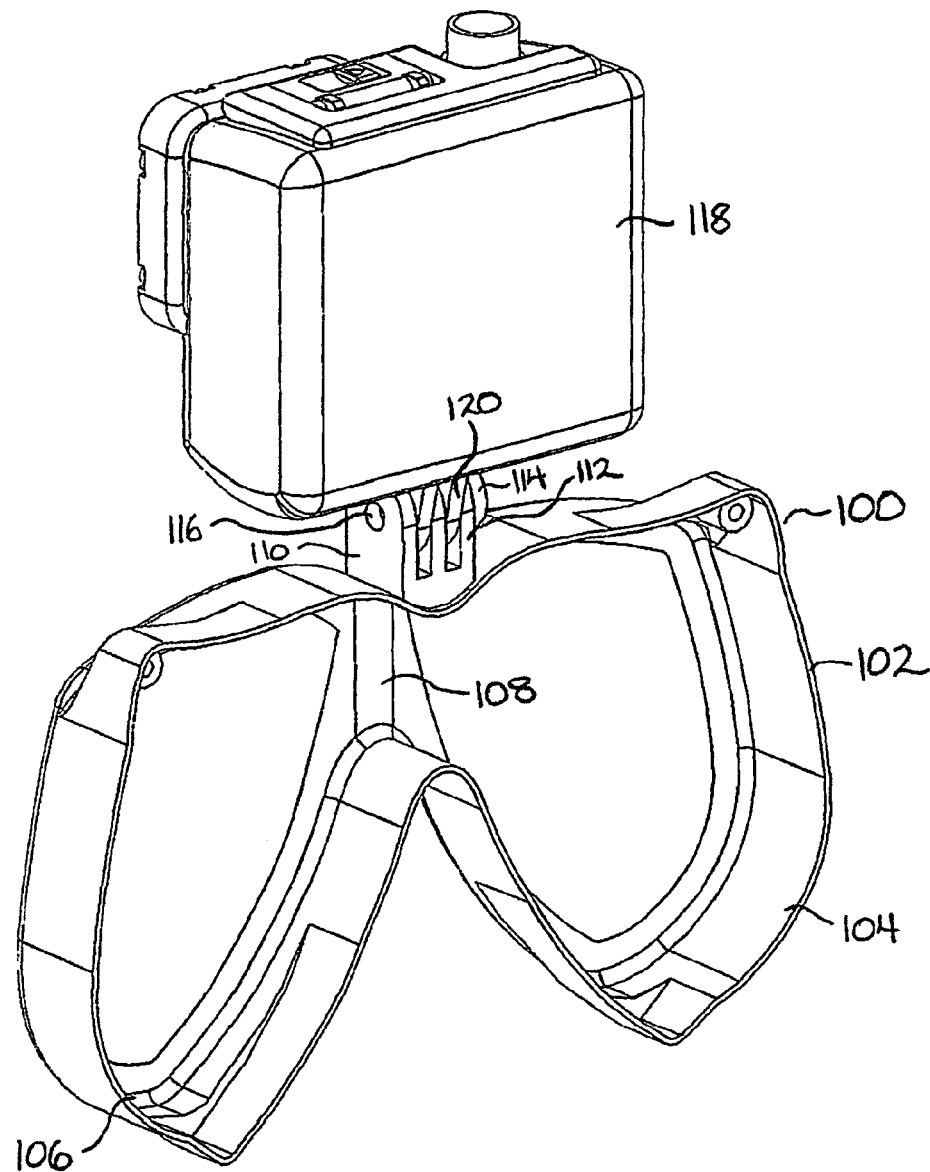
FIG. 11 is a rear view of the integrated headwear frame and attachment base of FIG. 10 with an imaging device attached to the attachment base.

FIG. 11 is a rear view of the integrated headwear frame and attachment base shown in FIG. 10. Imaging device 118 includes a camera mount 120 configured to mate with engagement tabs 110 and retainer engagement tab 112. The imaging device is secured to mounting assembly 100 by means of a threaded fastener (not shown) placed into through holes 116 through engagement tabs 110 and retainer engagement tab 112. Boss 114 is included on retainer engagement tab 112. Mounting assembly 100 further includes frame 102, a right lens frame 104, a left lens frame 106, and a nosepiece 108 that attaches right lens frame 104 to left lens frame 106.

It is to be understood that the description herein is exemplary of the invention only and is intended to provide an overview for the understanding of the nature and character of the disclosed illumination systems. The accompanying drawings are included to provide a further understanding of various features and embodiments of the method and devices of the invention which, together with their description serve to explain the principles and operation of the invention.

What is claimed is:

1. A mounting assembly, suitable for securing an imaging device to a head of a user, said mounting assembly comprising:

a headwear frame configured for placement over a face of the user, said headwear frame having a first mounting rim disposed at a first side of said headwear frame and a second mounting rim disposed at a second side of said headwear frame; and an attachment base, said attachment base including at least two engagement tabs configured to mate with a camera mount, said attachment base further including a first clamp configured to mate with said first mounting rim and a second clamp configured to mate with said second mounting rim, wherein said first clamp comprises a through hole to align with a through hole in said first mounting rim and said second clamp comprises a through hole configured to align with a through hole in said second mounting.

2. The mounting assembly of claim 1 wherein the attachment base is removably secured to the headwear frame by mechanical fasteners, and wherein the mechanical fasteners pass through the hole of the first clamp configured to align with the through hole of the first mounting and the hole of the second clamp configured to align with the through hold of the second mounting respectively.

3. A mounting assembly, suitable for securing an imaging device to a head of a user, said mounting assembly comprising:
- a headwear frame configured for placement over a face of the user, said headwear frame having a first mounting rim disposed at a first side of said headwear frame and a second mounting rim disposed at a second side of said headwear frame; and
- an attachment base, said attachment base including at least two engagement tabs configured to mate with a camera mount, said attachment base further including a first clamp configured to mate with said first mounting rim and a second clamp configured to mate with said second mounting rim;
- wherein said attachment base comprises a lateral beam having: said first clamp disposed at a first end of said lateral beam; said second clamp disposed at a second end of said lateral beam, and said at least two engagement tabs disposed on said lateral beam between said first clamp and said second clamp;
- wherein the attachment base further has a retainer engagement tab disposed on said lateral beam between said first clamp and said second clamp;
- wherein the engagement tabs and the retainer engagement tab are spaced apart so as to define open transverse slots suitable for the insertion of a camera mount.

4. The mounting assembly of claim 3 wherein the engagement tabs are located at a midpoint of the lateral beam.

5. The mounting assembly of claim 4 wherein the engagement tab comprises a boss with a recess configured to hold a fastening device.

6. A mounting assembly, suitable for securing an imaging device to a head of a user, said mounting assembly comprising:
- an integrated headwear frame and attachment base, wherein said headwear frame is configured for placement over a face of a user, and wherein said attachment base includes at least two engagement tabs, and wherein the engagement tabs are configured to mate with a camera mount;
- wherein said integrated headwear frame and attachment base further has a right lens frame and a left lens frame, wherein the right lens frame is attached to the left lens frame by nosepiece;
- wherein said attachment base further has a retainer engagement tab adjacent to the at least two engagement tabs;
- wherein the engagement tabs and the retainer engagement tab are spaced apart so as to define open transverse slots suitable for the insertion of a camera mount.

7. The mounting assembly of claim 6, wherein the engagement tabs are located above a nose piece.

8. The mounting assembly of claim 7, wherein the engagement tab comprises a boss with a recess configured to hold a fastening device.

* * * * *